United States Patent
Bulanov et al.

(10) Patent No.: US 12,252,580 B2
(45) Date of Patent: Mar. 18, 2025

(54) BIO-BASED EPOXY COATING COMPOSITIONS AND METHODS OF PREPARATION THEREOF

(71) Applicant: Kraton Chemical, LLC, Jacksonville, FL (US)

(72) Inventors: Michael Bulanov, Almere (NL); Patrick van Waes, Almere (NL)

(73) Assignee: Kraton Chemical, LLC, Jacksonville, FL (US)

(*) Notice: Subject to any disclaimer, the term of this patent is extended or adjusted under 35 U.S.C. 154(b) by 194 days.

(21) Appl. No.: 17/929,781

(22) Filed: Sep. 6, 2022

(65) Prior Publication Data
US 2023/0073852 A1   Mar. 9, 2023

Related U.S. Application Data

(60) Provisional application No. 63/261,004, filed on Sep. 8, 2021.

(51) Int. Cl.
| | |
|---|---|
| C08G 59/24 | (2006.01) |
| C08G 59/50 | (2006.01) |
| C08K 5/00 | (2006.01) |
| C08K 5/09 | (2006.01) |
| C09D 163/00 | (2006.01) |

(52) U.S. Cl.
CPC ......... C08G 59/245 (2013.01); C08G 59/502 (2013.01); C08K 5/0016 (2013.01); C08K 5/09 (2013.01); C09D 163/00 (2013.01); C08G 2150/00 (2013.01); C08G 2170/00 (2013.01); C08G 2190/00 (2013.01); C08K 2201/019 (2013.01)

(58) Field of Classification Search
CPC ........... C08G 59/245; C08G 59/502; C08G 2150/00; C08G 2170/00; C08G 2190/00; C08K 5/0016; C08K 5/09; C08K 2201/019; C09D 163/00

USPC .......................................................... 525/533
See application file for complete search history.

(56) References Cited

U.S. PATENT DOCUMENTS

2009/0209690 A1 * 8/2009 Sandstrom ............ B60C 1/0025
                                                          152/209.1

FOREIGN PATENT DOCUMENTS

CN          109021766 A     12/2018

OTHER PUBLICATIONS

Li, CN 109021766 A machine translation in English, Dec. 18, 2018. (Year: 2018).*
Pinova, "Product Selection Rosin Resins Names and Descriptions Markets Attributes Brand Product Name & Description Product Overview Typical Applications Agriculture Beverage Inks & Coatings Construction Foundry Gum Base Personal Care Rubber & Polymer Mod Specialty Adhesives Rosin Resins Rosin Derivatives", Oct. 1, 2014 (Oct. 1, 2014), XP055231107. URL:https://web.archive.org/web/20141129112607/http://www.pinovasolutions.com/uploads/files/resources/pinova-product-selection-guide.pdf.

* cited by examiner

*Primary Examiner* — David T Karst

(57) ABSTRACT

The disclosure relates to epoxy-based compositions comprising a decarboxylated rosin acid (DCR) component, suitable as an efficient plasticizer. It further improves hardness, elasticity, UV exposure viability properties of the paint and coating compositions. The DCR increases the bio-based renewable material content of a coating formulation and provide solutions for phthalate-free products. The DCR has a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445.

19 Claims, No Drawings

BIO-BASED EPOXY COATING COMPOSITIONS AND METHODS OF PREPARATION THEREOF

RELATED APPLICATIONS

This application claims priority from U.S. Provisional Application No. 63/261,004 with a filing date of Sep. 8, 2021, the disclosure of which is incorporated herein by reference.

FIELD

The disclosure relates to an epoxy composition comprising a bio-based component, methods of preparation, and applications thereof.

BACKGROUND OF THE INVENTION

Epoxy coatings are used in many applications, furniture, industrial and automotive, including the marine sector, since they are more heat resistant than latex-based and alkyd-based paints. Epoxy coatings such as those based on aromatic diglycidyl ethers of bisphenol A (BADGE) are typically used in protective coatings and marine coatings. Such coatings have strong adhesion to metal substrates and have good anti-corrosive properties as well as resistance to certain chemicals. For some applications, plasticizers are added to epoxy coating to control the film formation process. Plasticizers function by reducing film formation temperature and elasticize the coating. Some plasticizers work by embedding between the chains of polymers, spacing them apart, thus lowering the glass transition temperature for polymer and making it softer. In the prior art, phthalate products such as diisononylphthalate (DINP), diisodecylphthalate (DIDP), etc. have been widely used as a plasticizer. However, such phthalate products are restricted in use depending on the end-use applications.

There is still a need for phthalate-free epoxy coating material with desired physical properties.

SUMMARY

In one aspect, an epoxy composition comprising, based on the total weight of the epoxy composition, 5-25 wt. % of a decarboxylated rosin acid (DCR) having a density of 0.9 to 1.0 g/cm$^3$, a flash point of 135 to 175° C., an acid value of <50 mg KOH/g, measured according to ASTM D465, and a viscosity of 15 to 60 cSt at 40° C., measured according to ASTM D-445, 50-90 wt. % of an epoxy resin; and 5-50 wt. % of a amine-based hardener; and 0-50 wt. % of at least an additive, based on the total weight of the epoxy resin composition. The epoxy composition is phthalate-free and has a pot life of at least 6 hours at 23° C. and has a viscosity of 50 mPa-s to 10,000 mPa-s at 25° C.

In another aspect, the DCR comprises 40-100 wt. % of tricyclic compounds having 18-20 carbon atoms, wherein the sum of tricyclic compounds as aromatic and cycloaliphatic in the DCR is >50 wt. %, and the amount of tricyclic cycloaliphatic compound in the DCR is >15 wt. %, based on the total weight of the DCR.

In yet another aspect, the epoxy resin is selected from the group of resins, consisting of bisphenol A epoxy resin, bisphenol F epoxy resin, bisphenol S epoxy resin, an alicyclic epoxy resin, an aliphatic linear epoxy resin, a diglycidyl ether of a dihydric phenol, a diglycidyl ether of a dihydric alcohol, and combinations thereof.

In another aspect, the epoxy resin has an Epoxide Equivalent Weight of 160-335 g/mol., or 170-300 g/mol., or 180-250 g/mol., or 190-210 g/mol.

In yet another aspect, the hardener is selected from the group consisting of nitrogen-containing compounds, oxygen-containing compounds, sulfur-containing compounds, Lewis acids, Lewis bases, and combinations thereof.

DESCRIPTION

The following terms will be used throughout the specification.

"Coating" refers to a covering that is applied to a substrate, a surface of an object, or the object itself.

"Epoxide Equivalent Weight" (EEW) refers to the epoxide content, commonly expressed as the equivalent weight, which is the weight of resin containing 1 mole equivalent of epoxide (g/mol.).

"Bio-based" refers to products wholly or partly derived from biomass, e.g., plants, trees, or animals.

"Curable" refers to the capability of a compound to undergo one or more chemical reactions to form stable, covalent bonds among the constituent components.

"Phthalate-free" compositions refer to compositions wherein phthalate is not added, having <0.1 wt. %, or <0.05 wt. %, or <0.01 wt. % phthalate present.

"Pot Life" refers to the amount of time required for an initial viscosity to double, which is the term used for two-pack coatings that cure through a chemical reaction.

"VOC" refers to the volatile organic compound ("VOC") content in a liquid coating composition.

"Hydrocarbon" refers to organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. They may be straight, branched, or cyclic.

The disclosure relates to epoxy-based compositions comprising a decarboxylated rosin acid (DCR) component, suitable as an efficient plasticizer to replace phthalate, an epoxy resin component, and a hardener (curing) component. The phthalate-free DCR epoxy-based composition is characterized as having an excellent hardness, elasticity, and UV exposure properties, for use in the paint, adhesive, and coating compositions.

Decarboxylated Rosin Acid (DCR): The DCR is a rosin-derived composition obtained by decarboxylating a rosin acid, or by dimerizing and decarboxylating a rosin acid and separating/removing the dimerized species. The DCR is in the form of a liquid, and can be any of a crude DCR, a distilled or purified DCR, or mixtures thereof. The DCR can be hydrogenated and/or functionalized. Crude DCR is DCR containing 5-25 wt. % of higher molecular weight (450-1,500 Da) components, e.g., hydrocarbons, oligomers, polymers, impurities, or dimer/trimer of fatty acids. Distilled or purified DCR refers to crude DCR having heavy fractions removed to improve color, reduce sulfur, etc.

DCR is produced by the decomposition of rosin acids at high temperatures, e.g., 220-300° C. Rosin acids are normally solid, having a softening point of, e.g., 65-85° C. The rosin acid can be fully decarboxylated forming DCR. The rosin acid can be partially decarboxylated, forming DCR, which is a mixture of molecules, some of which contain monocarboxylic acids having a general molecular formula, e.g., $C_{20}H_{30}O_2$.

In embodiments, the DCR comprises one or more C=C groups, 40-100 wt. % of tricyclic compounds having 18-20 carbon atoms, 0-30 wt. % of components with <19 carbon atoms, and 40-100 wt. % of components with a molecular formula in the range from $C_{19}H_{20}$ to $C_{19}H_{34}$, based on the total weight of the DCR.

In embodiments, the DCR is characterized as having a m/z (mass/charge) value in the range of 220-280, or 230-270, or 234-262, or 235-265, or >230, or <265, measured by GC-FID-MS.

In embodiments, the DCR is characterized as having an oxygen content of <5%, or <3%, or <2%, or 0-1%. The oxygen content (in %) can be calculated as oxygen to carbon ratio, or the sum of oxygen atoms present divided by sum of carbon atoms present, with the number of oxygen and carbon atoms being obtained from elemental analyses.

In embodiments, sum of tricyclic compounds as aromatic and cycloaliphatic in the DCR is >50 wt. %, or >55 wt. %, or >60 wt. %, or >74 wt. %, or >90 wt. %, or up to 100 wt. %, of total weight of the DCR. Aromatic DCR is defined as DCR species having a MW of 252-256, with MW of 254 as having a reactive double bond, and cycloaliphatic DCR is defined as DCR species having a MW of 260 or 262.

In embodiments, the amount of cycloaliphatic DCR is >15 wt. %, or >20 wt. %, or >30 wt. %, or >40 wt. %, or >50 wt. %, or >80 wt. %, based on the total weight of the DCR.

In embodiments, total amount of tricyclic compounds having reactive double bond (C=C group) is 1-45 wt. %, or <40 wt. %, or <30 wt. %, or <20 wt. %, or <15 wt. %, or <10 wt. % of total weight of the DCR. Reactive C=C group is defined as DCR species having a MW of 254 or 258.

In embodiments, the DCR is characterized as having a lower acid value (carboxylic acid content) than the rosin acid feedstock for making the DCR. In embodiments, the DCR has an acid value of <50, or <45, or <40, or <35, or <30, or <25, or <20, or <15, or <10, or <7, or <5, or 0.5-40, or 0.5-30, or 0.5-20, or 1-20, or 1-15, or 1-15, or 1-10 mg/KOH, as measured using ASTM D1240-14 (2018) or ASTM D465.

In embodiments, the DCR has a density of 0.9-1.0, or 0.91-0.99, or 0.92-0.98, or 0.93-0.97, or 0.94-0.96, or >0.9, or <1.1 g/cm³.

In embodiments, the DCR is characterized as having viscosities comparable to those of petrochemical base oils, due in part to its relatively high molecular weights, for example, a viscosity of 15-60, or 18-55, or 20-50, or 22-48, or 25-45, or 28-42, or 30-40, or >20, or >25, or >28, or <45, or <50 cSt according to ASTM D-445, measured at 40° C.

In embodiments, the DCR has an aniline point of 3-40° C., or 5-40° C., or 5-30° C., or 5-25° C., or 2-20° C., or 5-20° C., or 5-15° C., or <25° C., or <20° C., or >3° C., or >5° C., or >8° C., according to ASTM D611.

In embodiments, the DCR has a pour point of −40 to +10° C., or −35 to +8° C., −30 to +5° C., or −30 to +0° C., or −30 to −5° C., or −28 to 0° C., or −28 to −5° C., or −28 to ~10° C., or >−30° C., or >−28° C., or <+5° C., according to ASTM D97.

In embodiments, the DCR has a flash point of 135-175° C., or 135-165° C., or 135-160° C., or 140-175° C., or 140-160° C., or 140-158° C., or 140-155° C., or >135° C., or >140° C., or <175° C., or <165° C., or <160° C., according to ASTM D92.

In embodiments, the DCR has a boiling point of 200-390° C., or 210-390° C., or 235-390° C., or 280-380° C., or 290-370° C., or 300-360° C., or >290° C., or >230° C., or >210° C., or <400° C., or <370° C., measured according to D2887.

In embodiments, the DCR has a Gardner Color of 0-12.0, or 0.5-12.0, or 0.8-12.0, or 0.9-11, or 1.0-10.0, or 1.0-6.0, or 1.0-5, or >0, or >1.0, or >1.2, or <10.0, or <7.0, or <6.0, or <5.0, or <2.4, or <3.0, according to ASTM D6166.

In embodiments, the DCR has a sulfur content of <500 ppm (0.05 wt. %), or <300 ppm (0.03 wt. %), or <200 ppm (0.02 wt. %), or <100 ppm (0.01 wt. %), or <10 ppm (0.001 wt. %), or 20-700 ppm (0.002-0.7 wt. %), 30-500 ppm (0.003-0.5 wt. %), or 40-400 ppm (0.004-0.4 wt. %), or 40-300 ppm (0.004-0.3 wt. %), or 40-200 ppm (0.004-0.2 wt. %), based on total weight of the DCR, measured according to ASTM D5453.

In embodiments, the DCR has a VOC of <5, or <4.75, or <4.5, or <4.25, or <4.0, or <3.75, or <3.5, or <3.25, or <3.0, or <2.75, or <2.5, or <2.25, or <2.0, or <1.5, or <1.0, or <0.5 wt. %, based on total weight of the DCR. The VOC of the DCR is measured according to methods: i) summing the percent by weight contribution from all VOCs present in the product at 0.01% or more, or ii) according to the EPA (Environmental Protection Agency) method 24 or equivalent.

In embodiments, the DCR has a Kb (Kauri butanol) value of 25-90, or 30-85, or 35-80, or 40-75, or 45-70, or 50-65, or >40, or >50, or >60, or >70, or >80, according to ASTM D1133.

In embodiments, the DCR has a viscosity index of <−100, or <−110, or <−115, or <−120, measured according to ASTM D2270. The viscosity index is an arbitrary, unit-less measure of a fluid's change in viscosity relative to temperature change, for example, index of viscosity at 40° C. and viscosity at 100° C.

In embodiments, the DCR has a δD value of 14-18, or 14.2-17.8, or 14.5-17.5, or 15-17, or 15.2-16.5; a δP value of 3-6, or 3.2-5.5, or 3.4-5.2, or 3.5-5.0; and SH value of 7-10, or 7.5-9.5, or 8-9, or 8.2-8.8.

In embodiments, the DCR has a surface tension of 25-50, or 28-45, or 30-40 dynes/cm, according to ASTM D1331.

In embodiments, the amount of DCR in the composition ranges from 1-40 wt. %, or 2-35 wt. %, or 5-25 wt. %, or 7-20 wt. %, or >2 wt. %, or <30 wt. %, based on the total weight of the composition.

Epoxy Resin Component: In embodiments, epoxy resin is in the form of a modified and unmodified liquid or a solid compound or blends thereof. The epoxy resins can be any of high or low average molecular weight ($MW_w$) resins, or blends.

In embodiments, the epoxy resin is a high $MW_w$ (typically referred to as solid) epoxy resin, having an EEW of 1,000 to 1,0000 g/eq, or 1,500-8,000 g/eq, or 2,000-6,000 g/eq, and a $MW_w$ of 3,000 to 40,000 g/mol, or 6,000-3,0000 g/mol, or 9,000-20,000 g/mol.

In embodiments, the epoxy resin is a low $MW_w$ (typically referred to liquid) epoxy resin having an EEW of <1,000 g/eq, or <300 g/eq, or 100 to 250 g/eq, or 120 to 200 g/eq, or 150 to 200 g/eq, and a $MW_w$ of 200 to 600 g/mol, or 240 to 400 g/mol, or 300 to 400 g/mol.

In embodiments, the epoxy resin is a semi-solid resin or liquid, with EEWs intermediate between the liquid and solid resin.

In embodiments, the epoxy resin is selected from saturated or unsaturated aromatic, aliphatic, cycloaliphatic compounds, or mixtures thereof. In embodiments, the epoxy resin is selected from the group consisting of bisphenol A epoxy resin, bisphenol F epoxy resin, bisphenol S epoxy resin, an alicyclic epoxy resin, an aliphatic linear epoxy resin, a diglycidyl ether of a dihydric phenol, a diglycidyl ether of dihydric alcohol and combinations thereof. These resins contain one or more repeating units derived from bisphenol A and/or F. In embodiments, the ethers, or repeating units, are obtained by polymerizing glycidyl ethers of bisphenol A and/or F with epichlorohydrin.

Non-limiting examples of epoxy resin compounds include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylme thylmethane, dihydroxydiphenylmethylpropylmethane, dihydroxydiphenylethylphenyl-methane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

In embodiments, the epoxy resin is a water-based or waterborne epoxy resin, e.g., polyester-based or acryl-based or silanol-functional silicone resins comprising the units $(R_3SiO_{1/2})a$; $(R_2SiO_{2/2})b$; $(RSiO3/2)c$ and $(SiO_{4/2})d$, wherein "R" is independently an alkyl, aryl group, or silanol-functional hydrocarbon group; and wherein the value of $a+b+c+d=1$.

In embodiments, the epoxy resins are modified with mono-functional or bi-functional reactive diluent, or cresyl ether, or non-phthalate, or non-reactive modifiers.

In embodiments, the epoxy resin component has an EEW of 160-335 g/mol., or 170-300 g/mol., or 180-250 g/mol., or 190-210 g/mol.

In embodiments, the amount of epoxy resin in the composition ranges from 30-95 wt. %, or 40-90 wt. %, or 50-85 wt. %, or 60-80 wt. %, or 65-75 wt. %, based on the total weight of all the components present in the composition.

Hardener Component: The hardener, also referred to as a curing agent or cross-linking agent, can be any compound having an active group being reactive with the epoxy group. Non-limiting examples includes nitrogen-containing compounds such as amines and their derivatives; oxygen-containing compounds such as carboxylic acids, carboxylic acid terminated polyesters, anhydrides, phenolformaldehyde resins, amino-formaldehyde resins, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents.

Other examples include dicyandiamide, substituted guanidines, phenolic compounds, amino compounds, benzoxazine, anhydrides, amidoamines, polyamides, polyamines, aromatic amines, carbodiimides, polyesters, polyisocyanates, polymercaptans, urea formaldehyde and melamine formaldehyde resins, diaminodiphenylsulfone and their isomers, aminobenzoates, various acid anhydrides, phenol-novolac resins and cresol-novolac resins, and mixtures thereof.

In embodiments, the hardener is selected from diamines and polyamines containing three or more active hydrogens. Examples includes, polyethylene amines (ethylene diamine, diethylenetriamine (DETA), triethyleneaminetetramine (TETA), pentaethylenchexamine and the like), toluenediamine (TDA), diethyltoluenediamine (DETDA), diaminodiphenylsulfone (DADS), 1,2-propylenediamine, 1,3-propylenediamine, 1,4-butanediamine, 1,5-pentanediamine, 1,5-hexanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazine, and the poly (alkylene oxide)diamines and triamines.

In embodiments, the epoxy resin and the plasticizer component(s) are first mixed forming a pre-mix, then a hardener is added to the pre-mix to form a curable epoxy resin. The pre-mixed resin and the hardener can be provided as separate components and mixed together at the point of application, e.g., by the end-user/applicator, at a weight ratio of hardener to premix of 10:90, or 20:80, or 30:70, or 40:60, or 50:50, or for the hardener to be present in the final composition in an amount of 3-45 wt. %, or 10-40 wt. %, or >5 wt. %, or <30 wt. %.

Optional Plasticizers: In embodiments, the epoxy resin composition further comprises a plasticizer component other than the DCR, selected from known plasticizers such as triaromatic phosphates, triphenyl phosphate, tricresyl phosphate, trixylyl phosphate; diesterified carboxylic acids, such as dibutyl sebacate, dibenzyl sebacate, dioctyl sebacate; other bio-based plasticizers such tung oil; diesterified aromatic dicarboxylic acids, such as dibutyl phthalate, diisononyl phthalate (DINP); dioctyl phthalate; chlorinated paraffins; hydrogenated terphenyls; modified polyphenyl; and mixtures thereof.

In embodiments, the additional plasticizer is used in an amount of 0.5-10 wt. %, or 2-8 wt. %, or 3-20 wt. %, or <5 wt. %, or <1 wt. %, based on the total weight of the epoxy resin coating composition.

Optional Additives: Optional additives can be added to the coating composition for various intended purposes, and at a concentration sufficient to prepare the epoxy resin composition with minimal impact to the properties of the coating composition.

Non-limiting examples of optional components include fillers; inorganic and organic pigments; anticorrosive pigments, anti-settling agents; dispersants; toughening agents; flexibilizing agents; processing aides; flow and leveling modifiers; slip and mar aids; defoamers; deaerators, adhesion promoters; diluents; stabilizers; plasticizers; curing catalysts; catalyst de-activators; flame retardants; aromatic hydrocarbon resins; coal tar pitch; petroleum pitch; carbon nanotubes; graphene; carbon black; carbon fibers; wetting agents; defoaming agents, and mixtures thereof.

In embodiments, the optional components and epoxy resin component are pre-mixed or can be added separately, with the optional components being present in an amount of up to 40 wt. %, or <35 wt. %, or 0.5-30 wt. %, or 1-20 wt. %, or >5 wt. %, based on the total weight of the coating composition.

Process to Prepare the Bio-based Epoxy Composition: The composition is prepared by mixing or dispersing all components in the DCR or vice versa. In embodiments, components other than the hardener can be mixed in any order, forming a pre-mix. At the time of application, the hardener is then added, forming the epoxy composition. In embodiments, the temperature during the mixing of all components may be generally from 23° C.-120° C. for 2 hrs-24 hrs., or 24° C.-60° C. for 2 hrs., or 120° C. for 2 hrs. Some of the components, e.g., the epoxy resin, and/or the plasticizer component in embodiments can be pre-heated to <75° C. or ~ 50° C., to facilitate mixing forming a pre-mix.

In embodiments, the components described above are mixed in amounts of: 5-90 wt. % of an epoxy resin and 5-10 wt. % of a DCR forming a pre-mix. A hardener is subsequently added to the premix at a weight ratio of hardener:premix of 50:50 to 15:85.

Bio-based Epoxy Resin Composition Properties: The cured epoxy compositions, applied as a coating, or adhesives exhibit improved flexural properties and tensile strength. They also have improved creep resistance, elastic modulus, and hardness.

In embodiments, the epoxy composition applied as a coating has a tensile strength of >60 MPa, or >65 MPa, or >70 MPa, or >75 MPa, or <85 MPa, measured at 23° C. 60° C., and 80° C., in accordance with DIN EN ISO 527-2.

In embodiments, the epoxy composition applied as a coating exhibits a flexural modulus of >100 MPa, or >110 MPa, or >115 MPa, or >121 MPa, or >125 MPa, or >135 MPa, or <150 MPa, measured by a 3-point Flexion Test in accordance with DIN EN ISO 527-2.

In embodiments, the epoxy composition has dynamic viscosity of 5,000 mPa·s to 15,000 mPa·s, or <14,000 mPa·s, or <10,000 mPa·s, or <8,000 mPa·s, or >5,000 mPa·s at 25° C.

In embodiments, the epoxy composition displays enhanced resistance to creep modulus of >1.8 MPa, or >2.76 MPa, or >3.5 MPa, or >4.12 MPa, or <5 MPa according to ASTM (D 2990-01) standard.

In embodiments, the epoxy composition has a density of >1 g/cm$^3$, or >1.05 g/cm$^3$, or >1.1 g/cm$^3$, or <1.2 g/cm$^3$.

In embodiments, the epoxy composition has a pot life at room temperature of >0.5 hrs., or >6 hrs., or 10-24 hrs., or >12 hrs., or 18-24 hrs.

Applications: The bio-based epoxy composition can be used in various coatings and paint systems, adhesives, sealants, etc., and other applications which require plasticizing properties e.g., from protecting pipelines to sealing warehouse floors, where a coating is needed to protect surfaces, strengthen materials, and protect from corrosion and decay. The use of DCR in epoxy coating composition further increases the bio-based renewable material content of a coating formulation and provides a "phthalate free" coating.

The epoxy compositions can be spray applied with or without the addition of solvent. It can be applied with electrostatic spray equipment or applied by brush, roller, or standard air and airless spray equipment.

Examples: The following illustrative examples are non-limiting. The following test methods were employed:

Dynamic mechanical analysis (DMA) Tg (° C.) was carried out as per ISO 6721-7 standard, in shearing mode with the frequency of 10 Hz, the temperature ramp of 3 K/min, and scanning range from −50° C. to 200° C.

Miscibility test conducted by mixing DCR with epoxy resin to assess the maximum miscible amount of additive. The test was conducted after curing the hardener sample with 5-20 wt. % DCR.

The Gardner color was recorded using the Lico 620 spectrophotometer.

Yellowing tests were visually observed and recorded.

Reactivity measurement method was conducted using a M1200E Multilogger with Type K thermocouple CZ550 device, providing estimated gel-time ($T_{gel}$) and exothermic ($T_{ex}$) data.

Density of cured resin measured per ČSN EN ISO 1183-1 standard.

Density of uncured resin measured per ČSN EN ISO 2811-2 standard.

Hardness shore A with 10-second dwell time was measured according to ASTM D2240.

The components used in the examples include:

DCR from Kraton Corporation having the properties shown in Table 1 was used for the examples. The DCR has the properties: $O_2$ of 0.39; % tricyclic compounds of 74.9; % aromatic MW 252 of 12.3; reactive double bond MW 254 of 0.1; aromatic MW 256 of 45.9; reactive double bond MW 258 of 0.2; cycloaliphatic MW 262 of 16.0.

TABLE 1

| Properties of DCR | | |
|---|---|---|
| Property | Method | Properties |
| Viscosity, cSt @ 40° C. | ASTM D445 | 32.4 cSt |
| Density at 20° C. | ASTM D1480 | 0.96 g/cm$^3$ |
| Viscosity Index | — | −179 |
| Color | ASTM D6166 | 1-2 Gardner |
| Flash Point, COC | ASTM D92 | 158° C. |
| Pour Point | ASTM D97 | −24° C. |
| Aniline Point | ASTM D611 | 15° C. |
| Sulfur | ASTM D5453 | <0.01% |
| Boiling Point Range | ASTM D2887 | 235-360° C. |
| Acid # (carboxylic acid) | ASTM D465 | <5 mg KOH/g |
| Aromatic Content (%) | ASTM D2140 | 32 |
| Naphthenic Content (%) | ASTM D2140 | 46 |
| Paraffinic Content (%) | ASTM D2140 | 22 |
| Kinematic viscosity 40° C. | ASTM D445 | 32.4 cst |
| Paraffinic Content (%) | ASTM D2140 | 22 |

CHS 520 is an unmodified, low molecular weight epoxy resin based on bisphenol A having EEW of 182-192 g/mole, viscosity at 25° C. of 12-14.5 Pa·s, and epoxy index of 5.21-5.5 mol./kg.

CHS 521 is a low molecular weight epoxy resin, modified with mono-functional reactive diluent, having EEW of 196-206 g/mole, viscosity at 25° C. of 0.6-0.9 Pa·s, and epoxy index of 4.85-5.1 mol/kg.

DINP is diisononyl phthalate.

TETA is triethylenetetramine.

JD230 is a polyetheramine curing agent, having 97% primary amine, with an average molecular weight of 230.

T554 is polyamidoamine curing agent.

T0903 is cycloaliaphatic amine, for use as curing as agent.

Examples 1-14: A number of coating compositions were formulated with the epoxy resin being CHS 520, according to the amounts/ratios in Table 2. "Epoxy & Plasticizer" refers to the pre-mixed plasticizer+CHS 520. The components were mixed gently with a spatula for 3-5 min, allowed to defoam for 10 min at 10 mBar pressure. Samples were taken for reactivity measurement. The samples were cured at 23° C. for 24 hrs. and 120° C. for 2 hrs.

TABLE 2

| Example | Plasticizer Type | Plasticizer (wt. %) | Hardener | Example Code | Epoxy & Plasticizer: Hardener (Ratio) |
|---|---|---|---|---|---|
| 1 | DINP | — | TETA | STD0-TETA | 89:11 |
| 2 | DINP | 5 | TETA | STD1-TETA | — |
| 3 | DINP | 10 | TETA | STD2-TETA | 90:10 |

TABLE 2-continued

| Example | Plasticizer Type | Plasticizer (wt. %) | Hardener | Example Code | Epoxy & Plasticizer: Hardener (Ratio) |
|---|---|---|---|---|---|
| 4 | DCR | 5 | TETA | 5% DCR-TETA | — |
| 5 | DCR | 10 | TETA | 10% DCR-TETA | 90:10 |
| 6 | DINP | — | JD230 | STD0-JD230 | 76:24 |
| 7 | DINP | 10 | JD230 | STD2-JD230 | 77:23 |
| 8 | DCR | 10 | JD230 | 10% DCR-JD230 | 77:23 |
| 9 | DINP | — | T554 | STD0-T554 | 77:23 |
| 10 | DINP | 10 | T554 | STD2-T554 | 79:21 |
| 11 | DCR | 10 | T554 | 10% DCR-T554 | 79:21 |
| 12 | DINP | — | T0903 | STD0-T0903 | 67:33 |
| 13 | DINP | 10 | T0903 | STD2-T0903 | 70:30 |
| 14 | DCR | 10 | T0903 | 10% DCR-T0903 | 70:30 |

Properties were measured with results as shown in Table 3.

TABLE 3

| Examples | Example Code | Tensile Strength (Mpa) | Flexural Modulus (Mpa) | DMA Tg (° C.) | Reactivity $T_{peak}$ (C) | Cured density g/cm³ |
|---|---|---|---|---|---|---|
| 1 | STD0-TETA | 70 | 106 | 123 | 241 | 1.185 |
| 2 | STD1-TETA | 75 | 126 | 97 | 224 | 1.178 |
| 3 | STD2-TETA | 68 | 123 | 97 | 210 | 1.173 |
| 4 | 5% DCR-TETA | 81 | 131 | 109 | 227 | 1.176 |
| 5 | 10% DCR-TETA | 75 | 142 | 103 | 215 | 1.166 |
| 6 | STD0-JD230 | 69 | 105 | 89 | 29 | 1.158 |
| 7 | STD2-JD230 | 64 | 113 | 70 | 27 | 1.148 |
| 8 | 10% DCR-JD230 | 76 | 111 | 75 | 27 | 1.145 |
| 9 | STD0-T554 | 71 | 102 | 114 | NA | 1.163 |
| 10 | STD2-T554 | 67 | 100 | 92 | 198 | 1.149 |
| 11 | 10% DCR-T554 | 78 | 121 | 93 | 200 | 1.146 |
| 12 | STD0-T0903 | 69 | 111 | 72 | 174 | 1.166 |
| 13 | STD2-T0903 | 56 | 100 | 58 | 141 | 1.158 |
| 14 | 10% DCR-T0903 | 68 | 124 | 59 | 134 | 1.156 |

Examples 15-16 (before adding hardener): Additional compositions were made replacing CHS 521 for CHS 520, at epoxy: plasticizer ratio of 85/15 for Example 15 and 80/20 for Example 16. The samples were observed for the miscibility test at 25° C. Examples 15-16 were hazy at 10° C., but clarified to the original state after several hours at 23° C.

Examples 17-18 (after curing with hardener): TETA was added to examples 15-16, giving examples 17-18. The samples were observed for yellowing and compatibility tests. The samples were hazy and yellow, with no improvement in compatibility, as compared to Example 1 (STD0-TETA), Example 4 (5% DCR-TETA), and Example 5 (10% DCR-TETA).

Example 19: The example 18 (80/20) was observed for yellowing test at higher temperatures of 80° C., 100° C., and 120° C., for 2 hrs. No yellowing was observed at higher temperatures.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An epoxy composition comprising, based on the total weight of the epoxy composition:
   (a) 5-25 wt. % of a decarboxylated rosin acid (DCR) comprising 40 to 100 wt. % of tricyclic compounds having 18 to 20 carbon atoms, wherein sum of the tricyclic compounds as aromatic and cycloaliphatic in the DCR is >50 wt. %, based on total weight of the DCR, and wherein the DCR has:
   a density of 0.9 to 1.0 g/cm³,
   a flash point of 135 to 175° C.,
   an acid value of <50 mg KOH/g, measured according to ASTM D465, and
   a viscosity of 15 to 60 cSt at 40° C., measured according to ASTM D-445;
   (b) 50-90 wt. % of an epoxy resin;
   (c) 5-50 wt. % of a hardener; and
   (d) 0-50 wt. % of at least an additive;
   wherein the epoxy composition is phthalate-free; and
   wherein the epoxy composition has a pot life of at least 6 hours at 23° C., and a viscosity of 50 mPa-s to 10,000 mPa-s at 25° C.

2. The epoxy composition of claim 1, wherein the DCR comprises one or more C=C groups.

3. The epoxy composition of claim 1, wherein amount of tricyclic cycloaliphatic compound in the DCR is >15 wt. %, based on total weight of the DCR.

4. The epoxy composition of claim 1, wherein the epoxy resin is selected from the group consisting of: bisphenol A epoxy resin, bisphenol F epoxy resin, bisphenol S epoxy resin, alicyclic epoxy resin, aliphatic linear epoxy resin, diglycidyl ether of a dihydric phenol, diglycidyl ether of a dihydric alcohol, and combinations thereof.

5. The epoxy composition of claim 1, wherein the epoxy resin has an Epoxide Equivalent Weight of 160-335 g/mol.

6. The epoxy composition of claim 1, wherein the hardener is selected from the group consisting of: nitrogen-containing compounds, oxygen-containing compounds, sulfur-containing compounds, Lewis acids, Lewis bases, and combinations thereof.

7. The epoxy composition of claim 6, wherein the hardener is a nitrogen-containing compound selected from the group consisting of: diamines and polyamines containing three or more active hydrogens, polyethylene amines, 1,2-propylenediamine, 1,3-propylenediamine, 1,4-butanediamine, 1,5-pentanediamine, 1,5-hexanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)-1,2-ethanediamine, N-(3-aminopropyl)-1,2-ethanediamine, 1,2-45 diaminocyclohexane, 1,3-diaminocyclohexane, 1,4-diaminocyclohexane, aminoethylpiperazine, and the poly(alkylene oxide)diamines and triamines.

8. The epoxy composition of claim 1, wherein the at least one or more additives is selected from the group consisting of: fillers, inorganic and organic pigments;
anticorrosive pigments, anti-settling agents, dispersants, toughening agents, flexibilizing agents, processing aides, flow and leveling modifiers, defoamers, deaerators, adhesion promoters, diluents, stabilizers, plasticizers, curing catalysts, catalyst de-activators, flame retardants, aromatic hydrocarbon resins, carbon black, carbon fibers, and mixtures thereof.

9. The epoxy composition of claim 1, wherein the epoxy resin is modified with a mono-functional reactive diluent, a bi-functional reactive diluent, cresyl ether, or a non-phthalate non-reactive modifier.

10. The epoxy composition of claim 1, wherein
the hardener is an amine; and
the amine hardener is present in a stoichiometric ratio of epoxy resin to amine hardener ranging from 10:90 to 50:50.

11. The epoxy composition of claim 1, wherein the epoxy composition is prepared by pre-mixing the epoxy resin with the DCR and the at least an additive forming a pre-mixture, and mixing the pre-mixture with the hardener.

12. A cured epoxy composition formed by curing the epoxy composition of claim 1 at 23° C. to 120° C.

13. The cured epoxy composition of claim 12, wherein the cured composition has a flexural strength of at least 100 MPa to 150 MPa, measured by a 3-point Flexion Test in accordance with DIN EN ISO 527-2.

14. The epoxy composition of claim 1, wherein the DCR has at least one of:
a viscosity of 20 to 50 cSt at 40° C., measured according to ASTM D-445;
an aniline point of 3 to 40° C., measured according to ASTM D611;
a pour point of −40 to +10° C., measured according to ASTM D97;
a boiling point of 235-360° C., measured according to D2887; and
a surface tension of 25 to 50 dynes/cm, measured according to ASTM D1331.

15. The epoxy composition of claim 1, wherein the DCR has a Gardner Color of 0 to 12.0, measured according to ASTM D6166.

16. The epoxy composition of claim 1, wherein the DCR has a sulfur content of <0.05 wt. % based on total weight of the DCR, measured according to ASTM D5453.

17. The epoxy composition of claim 1, wherein the epoxy composition is for use in coating a substrate.

18. The epoxy composition of claim 1, wherein the epoxy composition is for use in sealing and protecting a substrate.

19. The epoxy composition of claim 1, wherein the epoxy composition is for use as an adhesive.

* * * * *